United States Patent [19]

Brun

[11] 3,849,593

[45] Nov. 19, 1974

[54] AMPLITUDE CORRECTOR FOR THE CHROMINANCE COMPONENT OF A COLOUR TELEVISION SIGNAL

[75] Inventor: Roger Brun, Paris, France

[73] Assignee: U.S. Philips Corporation, New York, N.Y.

[22] Filed: Apr. 10, 1973

[21] Appl. No.: 349,792

[52] U.S. Cl. .................................................. 358/27
[51] Int. Cl. .......................... H04n 9/12, H04n 9/46
[58] Field of Search .............................. 178/5.4 AC

[56] References Cited

UNITED STATES PATENTS 3,708,613 1/1973 Nakabe et al. ................ 178/5.4 AC

*Primary Examiner*—Robert L. Griffin
*Assistant Examiner*—Marc E. Bookbinder
*Attorney, Agent, or Firm*—Frank R. Trifari; Henry I. Steckler

[57] ABSTRACT

An amplitude corrector for the chrominance component modulated in phase and amplitude of a complex colour television video signal in which the phase is maintained constant and in which the separation of luminace and chrominance spectra is not necessary.

A series resonant circuit is used whose inductance and capacitance are associated with a $\pi$-lowpass filter whose input terminal is connected to a variable resistor controlled by an auxiliary amplifier.

7 Claims, 5 Drawing Figures

AMPLITUDE CORRECTOR FOR THE CHROMINANCE COMPONENT OF A COLOUR TELEVISION SIGNAL

The present invention relates to an amplitude corrector for the chrominance component, modulated in phase and in amplitude, of a complex colour television video signal, particularly but not exclusively suitable for reporting equipment, comprising a series resonant circuit tuned to the frequency of the chrominance subcarrier, a circuit for filtering out the burst, a reference signal source, a comparator circuit and an auxiliary amplifier.

One of the major problems which occurs in the transmission from mobile stations through Hertz waves, for example, during reporting is the fixed or mobile echos caused by the presence of reflecting obstables whose positions relative to the transmitter and the receiver vary if one of the two is moved or if these reflecting obstacles themselves are mobile. These echo phenomena are not very troublesome for monochrome television but they are fatal for colour television; in fact, they generally affect the high frequency part of the video spectrum and this part of the video spectrum carries the chrominance information.

It is known that the video spectrum of a colour television signal comprises a luminance spectrum and a chrominance spectrum and has an upper limit of, for example, approximately 6.5 MHz and in the vicinity the chrominance subcarrier of 4.43 MHz in the French standard in the luminance spectrum Y and the chrominance spectrum C of high frequencies are mixed. These echo phenomena cause the modification of the video response curve, so that particularly at the level of the chrominance subcarrier and especially in the chrominance band the response signal is perturbed and the received image is changed especially by modification of the saturation.

Thus it is necessary to provide corrections. In order to reduce the high components of the video spectrum to the nominal value it is well known to pass an autochroma corrector or ACC. The principle of this known auto-chroma corrector is based on the use of two filters and on the separation of the luminance spectrum Y and the chrominance spectrum C. The first filter which has a gap of 4.43 MHz, referred to as the luminance filter or the filter Y, filters out the luminance spectrum and the chrominance filter or filter C filters out the spectrum located about the subcarrier of 4.43 MHz. It is known that the chrominance subcarrier of 4.43 MHz has a phase which is characteristic of the colour contents of the image section and an amplitude which is characteristic of the saturation of this image section. There is an element which is independent of the contents of the image and is called the burst which is transmitted as a reference. The function of the known autochroma corrector or ACC may be summarized as follows: with the aid of a bandpass filter or a chrominance filter C the chrominance signal is filtered out whereafter the signal passes through a variable gain amplifier; the burst is derived from the output of this amplifier and is subsequently compared with a known reference with the aid of a comparator; the result is an error voltage which controls the gain of the variable gain amplifier and corrects the level of the burst in order to maintain the amplitude constant and thereby the amplitude of the chrominance signal, that is to say, the saturation of the image. The chrominance signal which is thus corrected is added to the luminance signal at the output of the autochroma corrector ACC in order to re-establish the complete video spectrum.

A first drawback of such an auto-chroma corrector ACC is that it is necessary to separate the luminance spectrum and the chrominance spectrum. This is very troublesome for the following reason: if a luminance signal having a satisfactory definition is required, it is necessary to have trap which is sufficiently "fine" to only eliminate the low frequencies of the chrominance spectrum, which means that there are high components of the chrominance spectrum in the luminance signal Y: thus when the corrected chrominance spectrum C is recovered at the output of the auto-chroma corrector ACC and when it is combined again with the luminance signal Y, variations in the chrominance transitions occur in the complete signal because it is not possible to completely remove the portions of the chrominance spectrum corresponding to the chrominance transitions.

A further drawback is that the auto-chroma corrector system ACC does not correspond to the following fundamental criterion: when a fault is to be corrected by a correction system, it is desirable that this system is such that it does not detect its own faults when the fault to be corrected does not become manifest (that is to say, in the case when there is no echo). Thus due to the fact that in this known system the chrominance spectrum C and the luminance spectrum Y must be separated in order to correct the chrominance, it is necessary to pass through the whole system and to deteriorate the chrominance transitions in a manner which is not negligible.

The present invention has for its object to obviate these drawbacks and it proposes an arrangement which permits of maintaining the phase constant, which is characteristic of the colour whilst correcting the amplitude, which is characteristic of the saturation; its most important advantage is that it is not necessary to separate the luminance spectrum Y and the chrominance spectrum C.

The present invention has for its object to provide an amplitude corrector for the chrominance component modulated in phase and amplitude of a complex colour television video signal used particularly but not exclusively for reporting equipment and comprising a series resonant circuit tuned to the frequency of the chrominance subcarrier, a circuit for filtering out the burst, a reference signal source, a comparator circuit and an auxiliary amplifier and is characterized in that the inductor and the capacitor of the resonant circuit are constituted by the second element and the third element, respectively, of a $\pi$-lowpass filter, the input terminal of said filter being connected through a variable resistor whose resistance value is controlled by the auxiliary amplifier connected to the output terminal of an adaptor input stage having a negligible output impedance, while said circuit for filtering out the burst has a very high input impedance.

As a result of feeding the filter through an adaptor having a negligible output impedance it is possible by the sole control of the variable resistor to vary the gain of the $\pi$ low pass filter which has a series resonant circuit constituted by the inductor and the second capacitor. Since the circuit for filtering out the burst signal has a very high input impedance, for example, in the order of 100 to 1,000 times that of the corrector, the characteristics of the filter are not modified by this filtering action.

Such an arrangement permits of electronically controlling the amplitude of the chrominance signals relative to that of the luminance signals. An interesting property of this circuit is that it has a constant phase shift for a signal of 4.43 MHz independent of the value of the command voltage and the value of the capacitor constituting the first element of the $\pi$-filter.

When there is no echo and when consequently there are no distortions to be corrected the value of the variable resistor is adjusted automatically in such a manner that the response curve of the amplitude as a function of the frequency of this circuit is substantially flat throughout the video band. This embodiment has the great advantage of avoiding the deteriorations due to filtering and recombination of the signals.

French Patent Specification No. 1,048,970 describes a series resonant circuit used as a trap for regulating the amplitude of the chrominance signal without having to separate the luminance spectrum and the chrominance spectrum, but the principle of its operation is completely different; in fact, on the one hand the phase of the signal is not constant which in our view is fundamental because it is characteristic of the colour and on the other hand the series resonant circuit described in this French Patent Specification is used as a "trap" in order to absorb the energy. Thus due to its construction the system must supply more energy than is necessary for the chrominance subcarrier while the excess energy is absorbed in a variable manner by controlling the attenuation of the trap.

In the case of the invention described in this Patent Application the series resonant circuit is arranged in such a manner that the voltage is derived from the terminals of the capacitor and that the gain of the circuit is used as a parameter controlled by the variable resistor R.

The following description with reference to the accompanying drawings given by way of non-limiting example will make it readily understood how the present invention can be carried into effect;

FIG. 1 shows the video spectrum of a colour television signal.

FIG. 2*a* shows the spectrum of a luminance signal such as may be filtered out by a suitable filter.

FIG. 2*b* shows the spectrum of a filtered chrominance signal.

Figure 1:
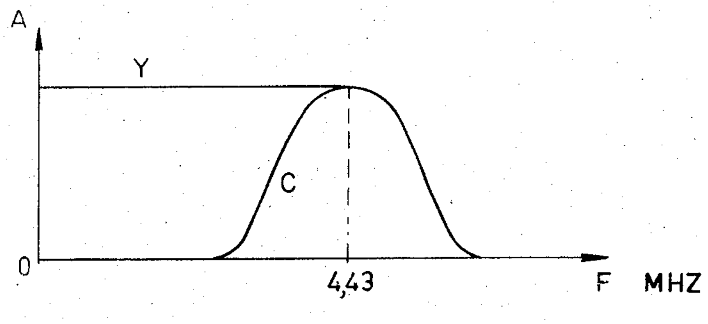

FIG. 1 shows the video spectrum of a colour television in a graph in which the amplitude is plotted on the ordinate and the frequency expressed in Megahertz is plotted on the abscissa and which shows the overlapping of the two spectra, the luminance spectrum denoted by Y and the chrominance spectrum denoted by C while the chrominance spectrum is located on either side of the subcarrier having a frequency of 4.43 MHz.

Figure 2A:
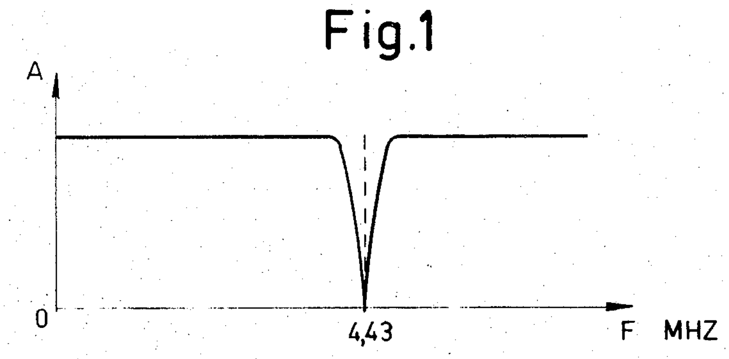
Figure 2B:
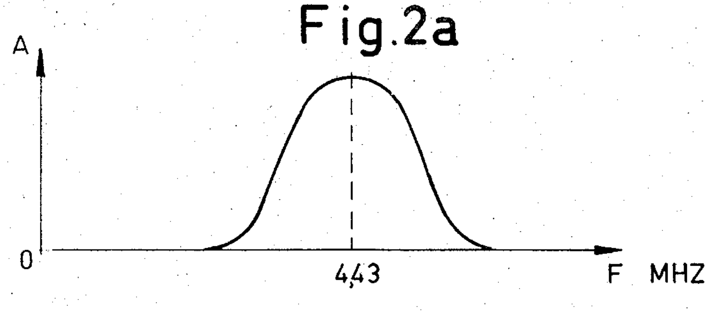

The graphs of FIGS. 2*a* and 2*b* with the amplitude plotted on the ordinate and the frequency plotted on the abscissa show the luminance spectrum Y and the chrominance spectrum C, respectively, as they are filtered out in a known auto-chroma corrector.

Figure 3:
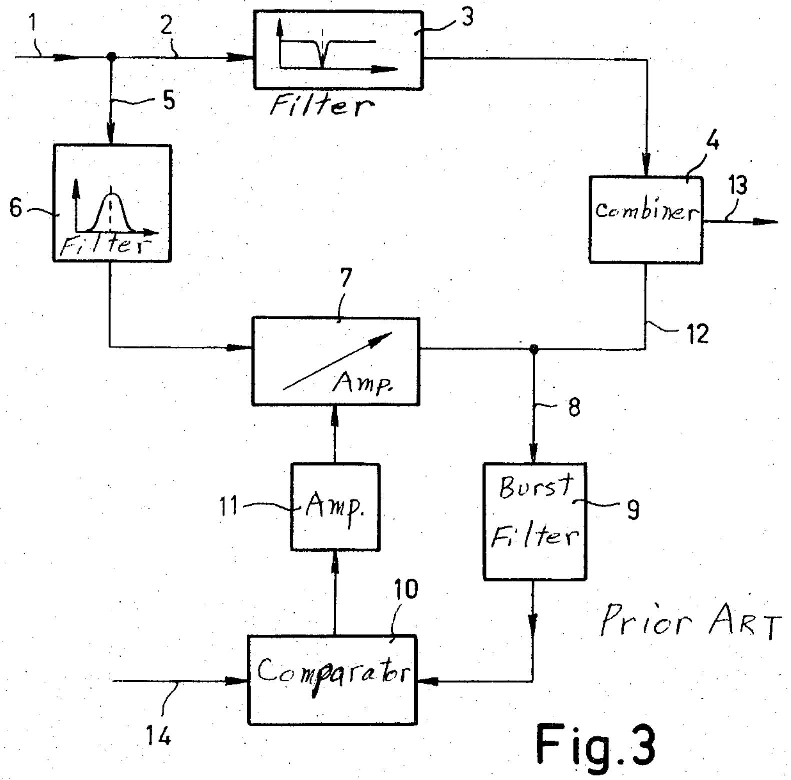
FIG. 3 shows the simplified circuit diagram of a conventional auto-chroma corrector ACC system.

FIG. 3 shows the conventional auto-chroma corrector having a lead 1 through which the complete video spectrum is transmitted, a lead 2 including a filter 3 for filtering out the luminance spectrum, while the lead after the filter 3 adjoins the known arrangement 4 in which the two spectra are re-united. Likewise a lead 5 is connected between the lead 1 and a filter 6 and after passage through said filter the lead terminates at a variable gain amplifier 7. The burst signal is filtered out by a lead 8 terminating at an arrangement 9 for filtering out the burst whereafter said burst is compared with a reference signal 14 applied to a comparator 10 whose output signal is amplified in an amplifier 11 and the resultant command voltage is applied to the variable gain amplifier which corrects the chrominance signal returned through the lead 12 to the arrangement 4 in which it is recombined with the luminance signal. The corrected spectrum is then obtained on the lead 13.

Figure 4:
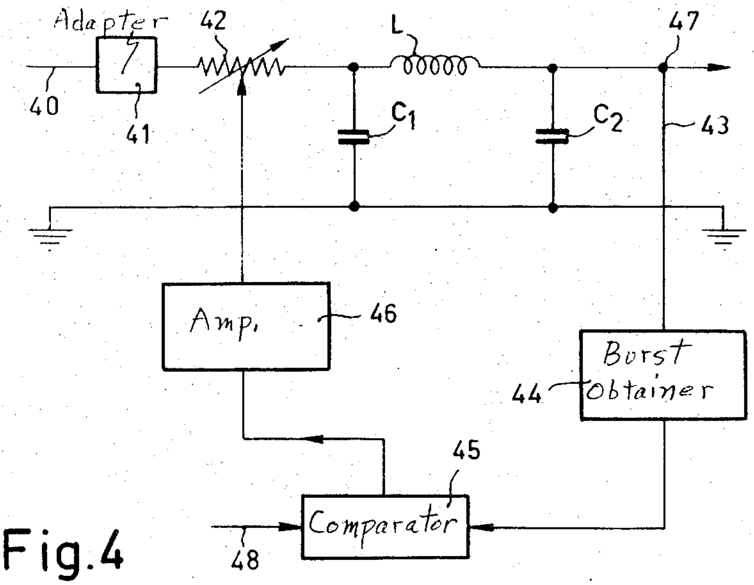
FIG. 4 shows the simplified circuit diagram of a circuit for controlling the amplitude according to the invention.

FIG. 4 shows the corrector circuit according to the invention comprising a lead 40 through which the video signal is passed via an adaptor 41 whose output impedance is negligible which circuit comprises inter alia a variable resistor 42, a $\pi$-lowpass filter constituted by a first capacitor $C_1$, an inductor L and a second capacitor $C_2$. The burst is obtained through a lead 43 and an arrangement 44 in accordance with known burst gate techniques and is compared in the comparator 45 with a reference signal applied through a lead 48. This results in an error voltage which via the amplifier 46 controls the value of the variable resistor 42.

The operation is as follows; the non-modulated reference signal, that is to say, the burst is filtered out at the output 47 of the $\pi$-lowpass filter and is compared with a reference signal in the comparator 45 and the error voltage amplified the amplifier 46 is used for controlling the value of the variable resistor 42.

The filter used has values such that its transfer function is satisfactorily varied by a single control element, the variable resistor 42. This variable resistor may be, for example, a MOS transistor or a field effect transistor. The transfer function is varied in amplitude but not in phase on the frequency of the chrominance subcarrier $fo = \omega o/2\pi$. In fact, the transfer function is expressed in the form of a complex number whose module $G_{F(x)}$ and whose argument $\phi_{F(x)}$ are given by the formula:

$$G_{F(x)} = Vs/Ve = 1/\sqrt{(1-x^2)^2 + x^2/Q^2\ [1 + a\ (1-x^2)]^2}$$

$$\phi_{F(x)} = \mathrm{Arctg} - x/Q\ [1 + a\ (1-x^2)]/1 - x^2$$

in which $Ve$ and $Vs$ are the voltages at the input and the output of the filter, $x = \omega/\omega_o$ ($\omega_o$ being the radian frequency of the chrominance subcarrier), $a = C_1/C_2$ (ratio of the capacitors of the $\pi$ filter) and in which $Q$ is equal to $L\omega_o/R$.

The value of $\omega_o$ is determined by the standards for the system used.

In order that the amplitude corrections are satisfactorily effected without affecting the phase of the chrominance signal the calculation shows that the transfer function obtained may be such that:

$G_F(x=1) = Q = L\omega_o/R$ (at any value of $a$)
$\Phi_F(x=1) = -90°$ (at any values of $R$ and $a$)

$G_F(x=0) = 1$ (at any values of $R$, $L$, $C_1$ and $C_2$)

For the mean value of the quality factor $Q$ which is equal to 1 the mean value of the variable resistor is $R_o$ and the result is that $L=R_0/\omega_0$: $C_2=1/L_0{}^{\omega 2}$ and $C_1=0.5\ C_2$. The part of the $\pi$ filter comprising the inductor L and the capacitor $C_2$ is brought in resonance with the frequency of the chrominance subcarrier $fo=\omega_0/2\pi$ in which $L$ and $C_2$ are such that the formulas $C_2=1/L\frac{\omega}{}{}_o^2$ (that is to say, $\omega_o=1/\sqrt{LC_2}$) and $L=R_o/\omega_o$ are verified; the control of the resonance is realized by the variable resistor R whose value as already described hereinbefore is controlled by the error voltage resulting from the comparison of a reference signal and a filtered burst on the lead; it is necessary to compensate as precisely as possible for transmission faults in the entire video band by defining the parameter a = $C_1/C_2$ in a correct manner.

For the value a = 0.5 it is found that the filter provided in the corrector corrects the faults introduced by the echo not only at the frequency of the subcarrier but also with a satisfactory approximation in the entire video spectrum.

The input circuit for filtering out the burst is constituted, for example, by a field effect transistor.

Satisfactory results will be obtained with a variable resistor $R$ having a minimum value of 100Ω and a maximum value of 1,600Ω.

$$R_{min} \leqslant R \leqslant R_{max}$$
$$100\Omega \leqslant R \leqslant 1{,}600$$

Particularly an interesting embodiment is obtained with a resistor of 390Ω in which the inductor $L$ has a value of 14/μH and $C_2$ has a value of 92 pF and $C_1$ has a value of 46 pF while the frequency of the subcarrier as described in this application is equal to $2\pi \times 4.43 \times 10^6$ Hertz (that is to say, a frequency of 4.43 MHz).

In all cases the phase is constant independent of the values of $R$ and of $C_1/C_2$ for the frequency corresponding to the chrominance subcarrier.

Such a corrector may be used in different color television systems such as NTSC, PAL and SECAM.

What is claimed is:

1. A corrector circuit for a television signal having a chrominance component, said circuit comprising an adapter having an input means for receiving said signal and an output having a negligable output impedance; a variable resistance means coupled to said adapter output and having a control input; a pi-type low pass filter having an input capacitor coupled to said variable resistance means, an inductor coupled to said input capacitor, and an output capacitor coupled to said inductor, said inductor and said output capacitor being resonant at the frequency of said chrominance component; means coupled to said output capacitor for obtaining a chroma burst from said component; and a comparison means having a first input means coupled to said obtaining means, a second input means for receiving a reference potential, and an output coupled to said control input.

2. A corrector as claimed in claim 1 further comprising an amplifier coupled between said comparison means output and said control input.

3. A corrector as claimed in claim 1, wherein the variable resistance means is a MOS transistor.

4. A corrector as claimed in claim 1, wherein the variable resistance means is a field effect transistor.

5. A corrector as claimed in claim 1, wherein the input of the obtaining means for the burst comprises a field effect transistor.

6. A corrector as claimed in claim 1, wherein the resistance of said resistance means varies between 100 and 1,600.

7. A corrector as claimed in claim 1, wherein the ratio of the capacitances of the -lowpass filter is in the order of 0.5.

* * * * *